United States Patent
Lee et al.

(10) Patent No.: US 10,330,470 B2
(45) Date of Patent: Jun. 25, 2019

(54) APPARATUS FOR MEASURING POSITION OF PROBE FOR INCLINOMETER, AND PROBE

(71) Applicants: Keun Ho Lee, Gwangju-si (KR); Seung Heon Lee, Gwangju-si (KR)

(72) Inventors: Keun Ho Lee, Gwangju-si (KR); Song Heon Lee, Gwangju-si (JP); Seung Heon Lee, Gwangju-si (JP)

(*) Notice: Subject to any disclaimer, the term of this patent is extended or adjusted under 35 U.S.C. 154(b) by 129 days.

(21) Appl. No.: 15/544,393

(22) PCT Filed: Nov. 10, 2015

(86) PCT No.: PCT/KR2015/012039
§ 371 (c)(1),
(2) Date: Jul. 18, 2017

(87) PCT Pub. No.: WO2016/117810
PCT Pub. Date: Jul. 28, 2016

(65) Prior Publication Data
US 2018/0003496 A1 Jan. 4, 2018

(30) Foreign Application Priority Data
Jan. 21, 2015 (KR) .................. 10-2015-0010062

(51) Int. Cl.
*G01C 9/02* (2006.01)
*G01C 9/10* (2006.01)
*G01C 9/06* (2006.01)
*E21B 47/022* (2012.01)
*G01C 15/00* (2006.01)

(52) U.S. Cl.
CPC .............. *G01C 9/10* (2013.01); *E21B 47/022* (2013.01); *G01C 9/02* (2013.01); *G01C 9/06* (2013.01); *G01C 15/00* (2013.01)

(58) Field of Classification Search
CPC ... G01C 9/10; G01C 9/02; G01C 9/06; G01C 15/00; E21B 47/022
USPC ...... 324/200, 207.15–207.25, 216, 245, 222, 324/256–258, 546, 500, 754.01–754.26, 324/755.11, 756.03, 758.01, 680, 600
See application file for complete search history.

(56) References Cited

U.S. PATENT DOCUMENTS

2015/0292265 A1* 10/2015 Vail, III .................... E21B 4/02
175/57
2016/0123136 A1* 5/2016 Puzrin ................... E21B 47/011
33/544.1

FOREIGN PATENT DOCUMENTS

| JP | 63-193304 | 12/1988 |
| JP | 2-098668 | 4/1990 |
| JP | 10-115627 | 5/1998 |

(Continued)

OTHER PUBLICATIONS

International Search Report for International Application No. PCT/KR2015/012039, dated Feb. 23, 2016.

*Primary Examiner* — Melissa J Koval
*Assistant Examiner* — Trung Nguyen
(74) *Attorney, Agent, or Firm* — Kile Park Reed & Houtteman PLLC

(57) ABSTRACT

Disclosed are an apparatus for measuring a position of a probe for an inclinometer, and a probe. The apparatus for measuring a position of a probe for an inclinometer comprises: a probe connection unit; a cable connection unit; a storage unit; a power supply unit; a magnetic field generator; a rotational number calculation unit, and a probe position calculation unit.

12 Claims, 3 Drawing Sheets

(56) References Cited

FOREIGN PATENT DOCUMENTS

| JP | 11-304430 | 11/1999 |
| JP | 11-337330 | 12/1999 |
| JP | 2000-500863 | 1/2000 |
| JP | 2000-283800 | 10/2000 |
| JP | 3150355 | 5/2009 |
| JP | 2013-096814 | 5/2013 |

* cited by examiner

APPARATUS FOR MEASURING POSITION OF PROBE FOR INCLINOMETER, AND PROBE

CROSS-REFERENCE TO RELATED APPLICATIONS

This U.S. non-provisional patent application claims priority under 35 U.S.C. § 119 of Korean Patent Application No. 10-2015-0010062 filed on 21 Jan. 2015, the entire contents of which are hereby incorporated by reference.

BACKGROUND

The present invention relates to a measuring instrument for construction and civil engineering works, and more particularly, to an inclinometer for measuring a displacement amount of the ground inserted into the underground.

An inclinometer is a measuring instrument used for judging a safety of a temporary facility and a ground relaxation region by measuring a position, a direction, a size, and a speed of a horizontal or vertical displacement amount of soil particles caused by other effects such as a cavitation phenomenon and a displacement amount of an underground water level during an excavation and filling work to compare and review the measured results with an expected displacement amount in a design.

In general, the inclinometer is used to measure a displacement in an excavation work such as a subway construction or a sheathing construction, a deformation of a bridge and an abutment, an expected slip surface of an inclined surface, and a displacement of a tunnel, a vertical mine, a dam, and all sorts of embankments.

FIG. 1 is a view illustrating a usage state of a conventional inclinometer.

As illustrated in FIG. 1, a general method for measuring an underground slope is implemented in such a manner that a probe 11 of an inclinometer is inserted into an underground hole, and then a slope for each depth is measured while a measurement cable 14 is lifted.

A displacement sensor 12 and a spring wheel 13 are installed on the probe 11, and a connecting unit 15 is installed on a cable 14 to connect the cable 14 to the probe 11. The probe 11 is moved by the cable 14, and the cable 14 is wound or unwound around a drum 16 by a force of a human or a machine to adjust a length, thereby varying a position of the probe 11.

As a wiring through which power or data may be transmitted is installed in the cable 14, power is supplied to the probe from the outside, and measured data is transmitted to an external output device.

The cable 14 is repeatedly wound or unwound around the drum 16 to use the inclinometer while supported by a cable supporting device 18.

The cable 14 may be damaged due to the above-described repeated operation. Here, since the conventional cable 14 include a wiring therein, the cable is further easily damaged, and costs for replacing the cable is expensive to increase the replacement costs. In addition, since the weight of cable 14 increases due to the inner wiring, more energy is consumed for moving the probe 11.

Also, when the cable 14 is damaged, replacement is difficult to considerably increase time and costs, and since the position of the probe 11 is adjusted by a length of the cable, the position of the probe 11 is difficult to be exactly adjusted.

SUMMARY

The present invention provides an apparatus for measuring a position of a probe for an inclinometer, which is lighter, inexpensive, and difficult to be damaged, and a probe to solve the above-described conventional problem.

The present invention also provides an apparatus for measuring a position of a probe for an inclinometer, which is capable of exactly measuring a position of a probe regardless of a cable, and a probe.

In accordance with an embodiment of the present invention, an apparatus for measuring a position of a probe for an inclinometer includes a probe connection unit, a cable connection unit, a power supply unit, a storage unit, a magnetic field generator, a rotational number calculation unit, and a probe position calculation unit.

The probe connection unit is connected to a probe on which a displacement measurement sensor for measuring a displacement of the ground is installed, the cable connection unit is connected to a cable for moving the probe in an inclinometer, the storage unit stores a measurement value measured by the displacement measurement sensor, the power supply unit supplies power to the probe, the rotating body rotates and moves while adjoining an inner surface of the inclinometer tube, a magnetic field generator formed in a partial region of the rotating body to generate a magnetic field while rotating according to the revolutions of the rotating body, the rotational number calculation unit calculates the number of revolutions of the rotating body by measuring the generated magnetic field, and a probe position calculation unit calculates a position of the probe by using the calculated number of the revolutions.

Through the above-described constitution, since an inner wiring may be removed from a cable adjusting a position of the probe, the cable may be manufactured to be lighter, inexpensive, and difficult to be damaged. Also, since the position of the probe may be exactly measured regardless of the cable, a displacement of the ground may be exactly measured even when the cable is deformed or replaced. Also, the present invention may be realized by using a conventional probe without changing a structure to be complicated.

Here, the magnetic field generator may be formed in each of a plurality of regions that are asymmetric to each other in a direction of the revolutions of the rotating body with respect to a rotation shaft of the rotating body. In particular, the magnetic field generator may be formed in each of two regions of which a distance therebetween is varied according to the direction of the revolutions of the rotating body with respect to the rotation shaft of the rotating body. Through the above-described constitution, the direction of the revolutions of the rotating body may be recognized even with a simple structure to exactly recognize the position of the probe.

Also, the apparatus may further include a wireless transmission unit transmitting the measurement value in a wireless manner. Through the above-described constitution, a ground displacement may be real-time recognized even from the outside.

Here, the probe position calculation unit may calculate the position of the probe from the calculated rotation rate of a plurality of rotors with respect to the plurality of rotors different from each other. Through the above-described constitution, various factors of unpredicted errors that may be generated from one rotating body may be easily corrected.

In accordance with another embodiment of the present invention, a probe for an inclinometer includes: a displacement measurement unit for measuring a displacement of the ground, a power supply unit supplying power to the displacement measurement unit, a storage unit storing a measurement value measured by the displacement measurement unit, a rotating body rotating and moving while adjoining an inner surface of the inclinometer tube, a magnetic field generator formed in a partial region of the rotating body to generate a magnetic field while rotating according to the revolutions of the rotating body, a rotational number calculation unit calculating the number of revolutions of the rotating body by measuring the magnetic field, and a position calculation unit calculating a position of the displacement measurement unit by using the number of the revolutions of the rotating body.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Preferred embodiments of the present invention will be described below in more detail with reference to the accompanying drawings.

Figure 1:
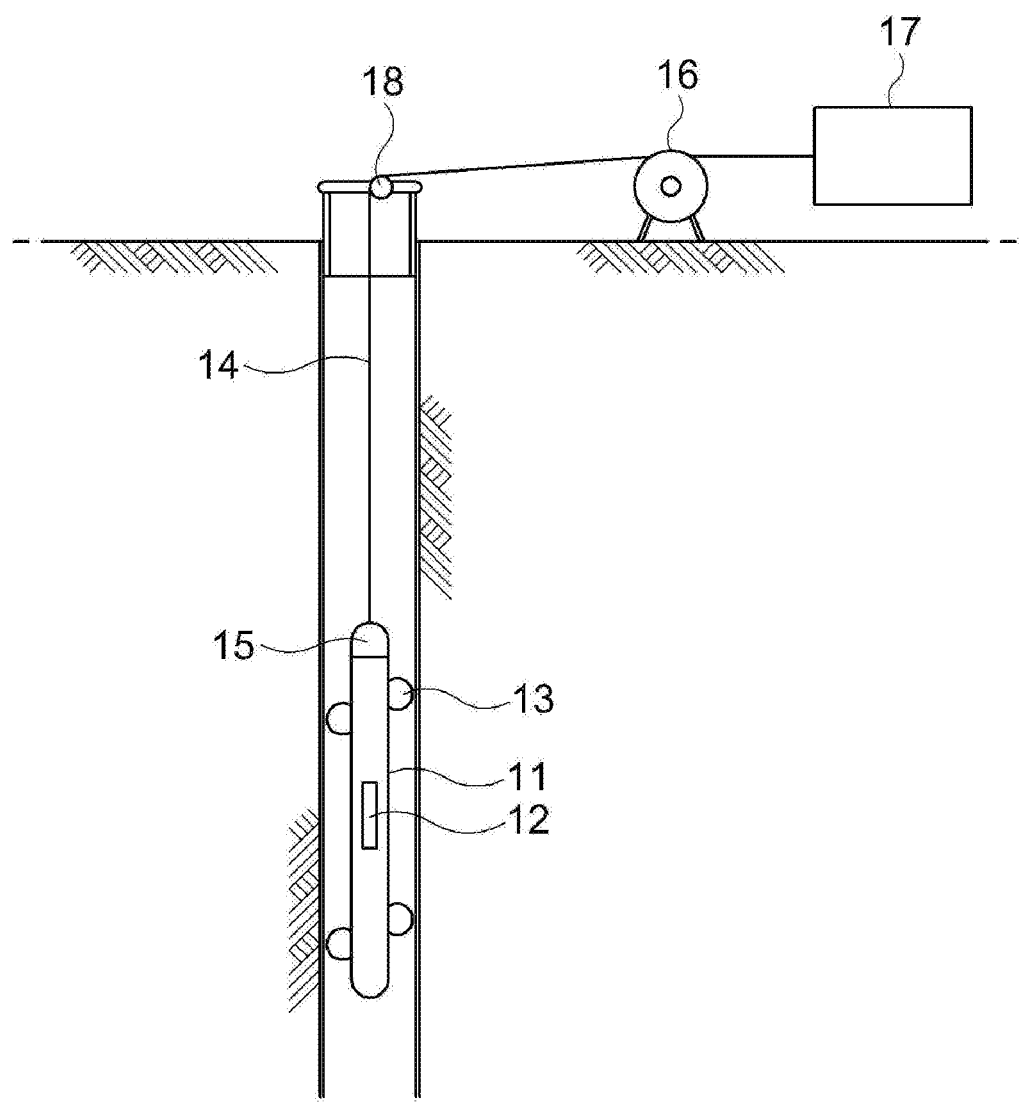
FIG. 1 is a view illustrating a usage state of a conventional inclinometer.
Figure 2:
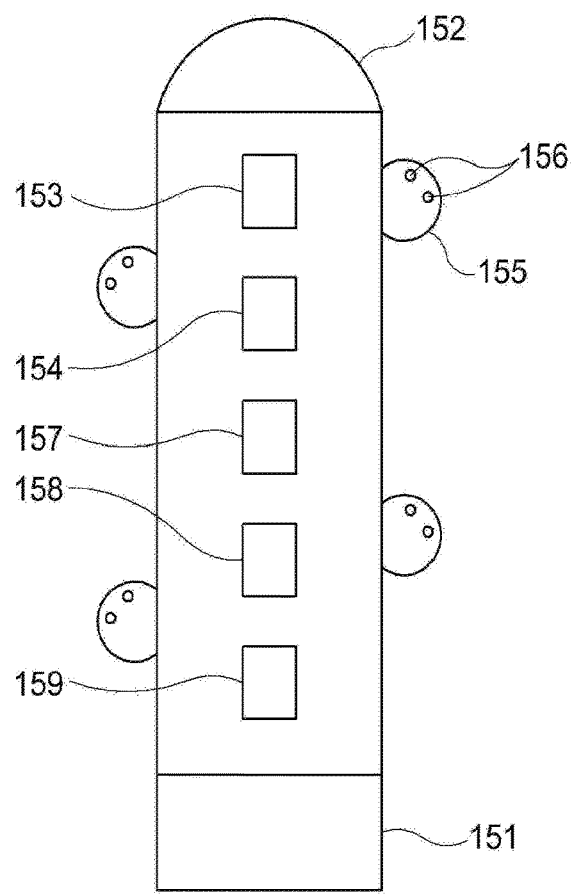
FIG. 2 is a view illustrating an apparatus for measuring a position of a probe for an inclinometer in accordance with an embodiment of the present invention.

FIG. 2 is a view illustrating an apparatus for measuring a position of a probe for an inclinometer in accordance with an embodiment of the present invention.

In FIG. 2, an apparatus for measuring a position of a probe for an inclinometer 150 includes a probe connection unit 151, a cable connection unit 152, a storage unit 153, a wireless transmission unit 154, a rotating body 155, a magnetic field generator 156, a rotational number calculation unit 157, a probe position calculation unit 158, and a power supply unit 159.

The probe connection unit 151 is connected to a probe on which a displacement measurement sensor for measuring a displacement of the ground is installed, and the cable connection unit 152 is connected to a cable for moving the probe in an inclinometer tube Here, the probe connection unit 151 may be realized in the same shape as that of a cable mechanically and electrically connected to a conventional probe for an inclinometer, and, in this case, the conventional probe for an inclinometer may be used as it is.

The cable connection unit 152 may be connected to a new type of cable that does not include a conventional inner wiring and desirably realized to be connected to various types of cables.

The storage unit 153 stores a measurement value measured by the displacement measurement sensor, and the power supply unit 159 supplies power to the displacement measurement sensor. As the storage unit 153 stores measurement values transmitted from the displacement measurement sensor in the probe, and the power supply unit 159 supplies the power, the inner wiring necessary to transmit the measurement value to a separated external storage device or operate the displacement measurement sensor may be removed from the cable.

The wireless transmission unit 154 transmits the measurement value stored in the storage unit 153 in a wireless manner. Through the above-described constitution, a displacement of the ground may be real-time recognized even from the outside. The wireless transmission unit 154 may be realized in various wireless communication types as necessary, and a user may real-time recognize the displacement of the ground by using a mobile communication terminal or the like according to the realization type.

A wireless receiving unit (not shown) may be provided together with the wireless transmission unit 154. In this case, the wireless receiving unit may be realized so that a control command is transmitted to the apparatus for measuring a position of a probe for an inclinometer.

The rotating body 155 rotates and moves while adjoining an inner surface of an inclinometer tube. Here, the rotating body 155 may be realized by means of a spring wheel installed in the probe or the like.

The magnetic field generator 156 is formed in a partial region of the rotating body 155 to generate a magnetic field while rotating according to rotation of the rotating body 155. Here, the magnetic field generator 156 may be formed in each of a plurality of regions that are asymmetric to each other in a direction of revolutions of the rotating body 155 with respect to a rotation shaft of the rotating body 155.

In particular, the magnetic field generator 156 may be formed in each of two regions of which a distance therebetween is varied according to the direction of the revolutions of the rotating body 155 with respect to the rotation shaft of the rotating body 155. Through the above-described constitution, the direction of the revolutions of the rotating body may be recognized even with a simple structure to exactly recognize the position of the probe.

Figure 3:
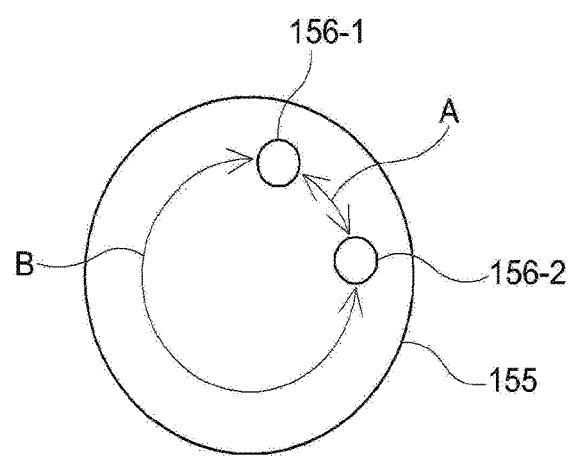
FIG. 3 is a schematic view illustrating a rotating body and a magnetic field generator.

FIG. 3 is a schematic view of the rotating body and the magnetic field generator disposed in the rotating body in FIG. 2.

In FIG. 3, two magnetic field generation regions are formed in a partial region of the rotating body 155. Through the above-described constitution, since an additional power or communication device is not necessarily installed on the rotating body 155, the revolutions of the wheel may be recognized even with the simple constitution.

In particular, a distance between two magnetic field generation regions 156-1 and 156-2 is varied according to the direction of the revolutions. That is, a distance A and a distance B are not equal to each other. Through the above-described constitution, the direction of the revolutions of the rotating body 155 may be recognized by using only time difference between detections of magnetic fields respectively generated from the two magnetic field generation regions 156-1 and 156-2.

The rotational number calculation unit 157 calculates the number of revolutions of the rotating body 155 by measuring the generated magnetic field. The rotational number calculation unit 157 may recognize the revolutions of the rotating body 155 by a variation in intensity of the magnetic field periodically varying by the revolutions of the rotating body 155, and the number of the revolutions of the rotating body 155 may be determined by the repeated number of the variation cycle.

The amount of revolutions of the rotating body 155 may be indirectly measured as described above. Alternatively, the amount of the revolutions of the rotating body 155 may be directly measured by using an encoder installed inside or outside the rotating body, and, in this case, the amount of revolutions of the rotating body may be measured by measuring a displacement of a rotation angle of the rotating body 155.

The probe position calculation unit 158 calculates a position of the probe by using the calculated number of revolutions. Here, the probe position calculation unit 158 may calculate the position of the probe by using the calculated number of revolutions of a plurality of rotating bodies with respect to the plurality of rotating bodies that are different from each other. Through the above-described constitution, various factors of unexpected errors that may be generated from one rotating body may be easily corrected.

The current position of the probe may be calculated with reference to a predetermined position by using the number of the revolutions of the rotating body 155. In case that the number of the revolutions of each of the plurality of rotating bodies 155 is measured, even when an unexpected error such as slip occurs in a portion of the rotating bodies, the unexpected error may be recognized by using the number of revolutions measured from different rotating bodies, and thus an exact measurement may be implemented.

The apparatus for measuring a position of a probe 150 may be constituted to be integrally formed in the probe. In this case, the separate probe connection unit 151 may be omitted.

Figure 4:
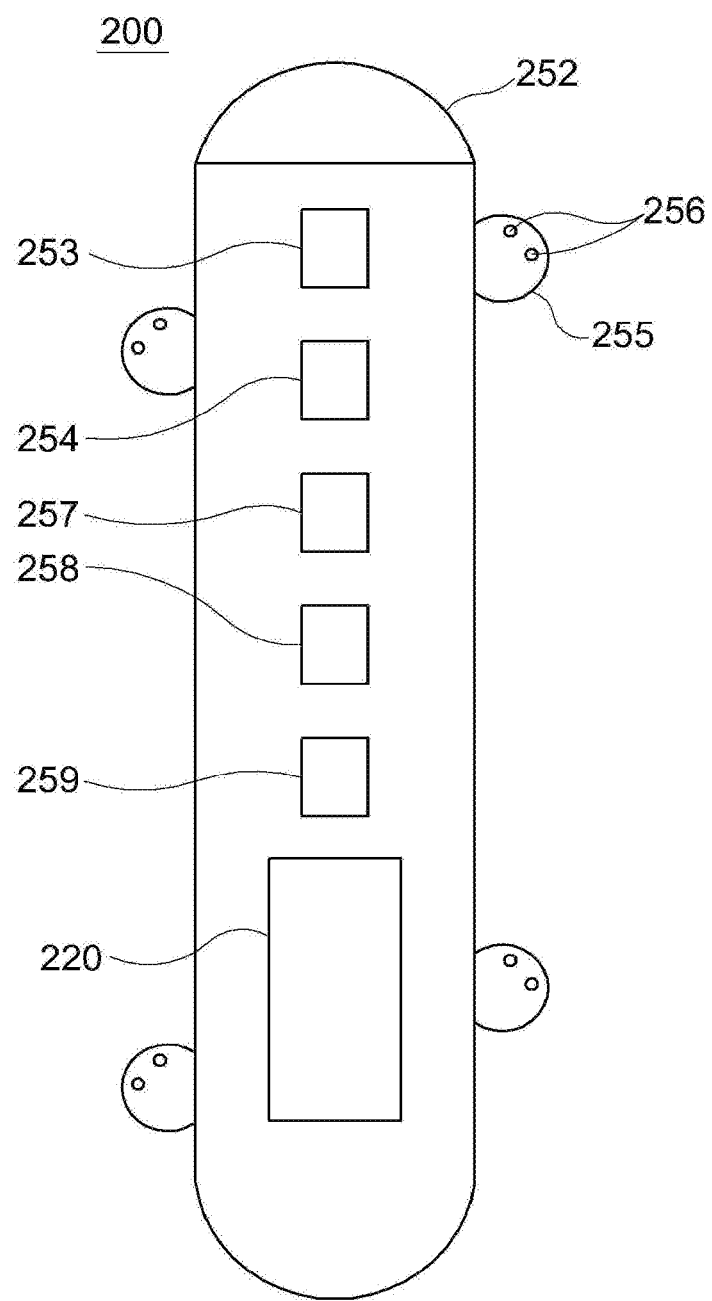
FIG. 4 is a view illustrating a probe for an inclinometer in accordance with an embodiment of the present invention.

FIG. 4 is a schematic view of a probe for an inclinometer in accordance with another embodiment of the present invention.

In FIG. 4, the probe connection part in FIG. 2 is not illustrated and the storage unit 253, the wireless transmission unit 254, and the power supply unit 259 are disposed in the probe 200 together with a displacement measurement unit 220.

Also, in FIG. 4, a magnetic field generator 256 is formed on an own spring wheel 255 of the probe 200.

In accordance with the present invention, since the inner wiring may be removed from the cable adjusting the position of the probe, the cable may be manufactured to be lighter, inexpensive, and difficult to be damaged.

Also, since the position of the probe may be exactly measured regardless of the cable, the displacement of the ground may be exactly measured even when the cable is deformed or replaced.

Also, the present invention may be realized by using a conventional probe without changing the structure to be complicated.

Also, the direction of the revolutions of the rotating body may be recognized even with a simple structure to exactly recognize the position of the probe.

Also, the displacement of the ground may be real-time recognized even from the outside.

Also, various factors of unpredicted errors that may be generated from one rotating body may be easily corrected.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. An apparatus for measuring a position of a probe for an inclinometer, the apparatus comprising:
   a probe connection unit connected to a probe on which a displacement measurement sensor for measuring a displacement of the ground is installed;
   a cable connection unit connected to a cable for moving the probe in an inclinometer;
   a power supply unit supplying power to the probe;
   a storage unit for storing a measurement value measured by the displacement measurement sensor;
   a rotating body rotating and moving while adjoining an inner surface of the inclinometer tube;
   a rotation amount measurement unit measuring an amount of revolutions of the rotating body; and
   a probe position calculation unit calculating a position of the probe by using information on the amount of the revolutions of the rotating body,
   wherein the rotation amount measurement unit comprises:
   a magnetic field generator formed in a partial region of the rotating body to generate a magnetic field while rotating according to the revolutions of the rotating body; and
   a rotational number calculation unit measuring the magnetic field to calculate the number of revolutions of the rotating body.

2. The apparatus of claim 1, wherein the magnetic field generator is formed in each of a plurality of regions that are asymmetric to each other in a direction of the revolutions of the rotating body with respect to a rotation shaft of the rotating body.

3. The apparatus of claim 2, wherein the magnetic field generator is formed in each of two regions of which a distance therebetween is varied according to the direction of the revolutions of the rotating body with respect to the rotation shaft of the rotating body.

4. The apparatus of claim 3, further comprising a wireless transmission unit transmitting the measurement value in a wireless manner.

5. The apparatus of claim 4, wherein the probe position calculation unit calculates a position of the probe by using the number of revolutions of the plurality of rotating bodies, which is calculated with respect to the plurality of rotating bodies that are different from each other.

6. The apparatus of claim 1, wherein the rotation amount measurement unit measures a displacement of a rotation angle of the rotating body to measure the amount of the revolutions of the rotating body.

7. A probe for an inclinometer, the probe comprising:
   a displacement measurement unit for measuring a displacement of the ground;
   a power supply unit supplying power to the displacement measurement unit;
   a storage unit storing a measurement value measured by the displacement measurement unit;
   a rotating body rotating and moving while adjoining an inner surface of the inclinometer tube;
   a rotation amount measurement unit measuring an amount of revolutions of the rotating body; and
   a position calculation unit calculating a position of the displacement measurement unit by using information on the amount of the revolutions of the rotating body,
   wherein the rotation amount measurement unit comprises:
   a magnetic field generator formed in a partial region of the rotating body to generate a magnetic field while rotating according to the revolutions of the rotating body; and a rotational number calculation unit measuring the magnetic field to calculate the cumber of revolutions of the rotating body.

8. The probe of claim 7, wherein the magnetic field generator is formed in each of a plurality of regions that are asymmetric to each other in a direction of the revolutions of the rotating body with respect to a rotation shaft of the rotating body.

9. The probe of claim 8, wherein the magnetic field generator is formed in each of two regions of which a distance therebetween is varied according to the direction of the revolutions of the rotating body with respect to the rotation shaft of the rotating body.

10. The probe of claim 9, further comprising a wireless transmission unit transmitting the measurement value of the displacement measurement unit in a wireless manner.

11. The probe of claim 10, wherein the position calculation unit calculates a position of the displacement measurement unit by using the number of revolutions of the plurality of rotating bodies, which is calculated with respect to the plurality of rotating bodies that are different from each other.

12. The probe of claim 7, wherein the rotation amount measurement unit measures a displacement of a rotation angle of the rotating body to measure the amount of the revolutions of the rotating body.

* * * * *